United States Patent [19]

Daniels, Jr. et al.

[11] Patent Number: 4,847,310

[45] Date of Patent: Jul. 11, 1989

[54] SINGLE-LAYERED, CHEMICAL RESISTANT FLOOR COVERING MATERIAL

[75] Inventors: Donald L. Daniels, Jr., Lakewood; Ruben G. Garcia, Littleton, both of Colo.

[73] Assignee: Manville Corporation, Denver, Colo.

[21] Appl. No.: 244,231

[22] Filed: Sep. 14, 1988

[51] Int. Cl.$^4$ .................. C08L 23/10; C08L 95/00
[52] U.S. Cl. ........................... 524/35; 524/62; 524/64; 524/66; 524/70; 524/71; 524/430; 524/445
[58] Field of Search ............. 524/35, 70, 71, 430, 524/62, 66, 64, 445

[56] References Cited

U.S. PATENT DOCUMENTS 4,265,957  5/1981  Severance et al. .............. 428/143

4,717,743  1/1988  Wakabayashi et al. .............. 524/70

OTHER PUBLICATIONS

"Dura-Tred ® Floor Plank-Product Description and Recommended Application Directions", 10/87.

*Primary Examiner*—Allan M. Lieberman
*Attorney, Agent, or Firm*—John D. Lister; Cornelius P. Quinn; Gregory A. Evearitt

[57] ABSTRACT

A floor covering material with enhanced chemical, particularly acid, resistance containing refractory oxide, asphaltite, high oil asphalt, asphalt with a softening point in the range of about 210°–230° F., reinforcing fiber, crystalline polyolefin polymer and optionally, non-crystalline polyolefin polymer. The disclosed floor covering material is single-layered.

8 Claims, No Drawings

SINGLE-LAYERED, CHEMICAL RESISTANT FLOOR COVERING MATERIAL

FIELD OF THE INVENTION

This invention relates to a floor covering material and more particularly, it relates to a single-layered chemical resistant floor covering material which is especially resistant to acids.

BACKGROUND OF THE INVENTION

The design of floor covering systems for use in industrial environments, e.g. plant and laboratory facilitites, is very important because they are exposed to a wide variety of chemicals such as organic solvents, oils, cleaning solutions, and organic and inorganic acids all of which can cause errosion thereby necessitating replacement of the floor covering. Their replacement can be expensive because of the cost of the ingredients as well as the labor typically involved.

U.S. Pat. No. 4,265,957 discloses a conventional flooring covering system composed of a multi-layered covering of epoxy resin, fiber glass reinforced epoxy resin, an epoxy resin containing filler material, and a sealer coat of a polyurethane resin. While this flooring system has general chemical resistance, its acid resistance could be improved. Furthermore, because of the multi-layered aspect of the floor covering, it can be expensive as well as time consuming to install.

One product marketed in the past as a floor covering contained asphalt (gilsonite and high oil), fiber glass, clay-cellulose fiber, and a relatively large amount of limestone. Whereas the foregoing was not a multi-layered system, the floor covering was not acid resistant.

Therefore, what is needed is a floor covering which has good chemical (including acid) resistance, is relatively inexpensive, and is easy to replace.

BRIEF SUMMARY OF THE INVENTION

Applicants have discovered a material which does not have the drawbacks of previous floor covering materials. The inventive floor covering material comprises about 50–65 wt% refractory oxide; 9–15 wt% asphaltite; 5–10 wt% high oil asphalt; 5–15 wt% asphalt having a softening point in the range of about 210°–230° F.; 0–7 wt% reinforcing fiber; 5–15 wt% crystalline polyolefin polymer; and 0–10 wt% amorphous (non-crystalline) polyolefin polymer.

The inventive material makes an excellent floor covering because it has a high chemical resistance, especially to acids. Furthermore, because it is not multi-layered, it is very easy to install and replace. Therefore, the inventive material offers significant advantages over existing floor covering systems.

Other features and aspects of the invention, as well as other benefits, will readily be apparent from the more detailed description of the invention which follows.

DETAILED DESCRIPTION OF THE INVENTION

The inventive floor covering material comprises the following ingredients at the indicated weight percentage levels based upon the total weight of the product:

| Ingredient | General | Preferred | Most Preferred |
|---|---|---|---|
| refractory oxide | 50–65 wt% | 52–58 wt% | 55 wt% |
| asphaltite | 9–15 wt% | 11–15 wt% | 13 wt% |
| high oil asphalt | 5–10 wt% | 6–9 wt% | 8 wt% |
| asphalt, softening pt 210°–230° F. | 5–15 wt% | 5–10 wt% | 7 wt% |
| reinforcing fiber | 0–7 wt% | 3–7 wt% | 4 wt% |
| crystalline polyolefin polymer | 5–15 wt% | 6–12 wt% | 7 wt% |
| amorphous non-crystalline polyolefin polymer | 0–10 wt% | 0–10 wt% | 6 wt% |

The refractory oxide utilized in the present invention will preferably be in a particulate or otherwise comminuted form. Examples of refractory oxides include but are not limited to silica, zirconia, and alumina with the latter preferred.

Asphaltite as used herein refers to a natural hydrocarbon substance typically occuring as a coal-like solid which is mined much like other minerals and is available commercially essentially in its native state.

Examples of asphalites include glance pitch, grahamite, and gilsonite with the latter preferred.

The high oil asphalts employed in the present invention are not paving grade asphalts but are more in the nature of what is recognized in the roofing industry as a roofer's flux. High oil asphalt is residual from a refining tower, either vacuum or atmospheric which has a low asphaltene content, e.g. less than about 15% (weight) and a high penetration (at 77° F.), such as in the range of about 140 to 80 dmm.

Another type of asphalt employed in the present invention is sometimes referred to as shingle coating asphalt or more simply just as coating asphalt. Generally, these terms refer to asphalt which has been air blown or otherwise oxidized with a resulting softening point (ring and ball method) in the range of from about 210°–230° F.

The reinforcing fiber used in the present invention may be either inorganic or organic with clay stabilized cellulose fibers preferred.

The inventive flooring composition is made by the generalized procedure of mixing the ingredients, heating the resulting mixture, and then extruding the mixture. Preferably, the mixture will be heated to a temperature in the range of about 200°–300° F.

The following non-limiting example further illustrates the present invention.

EXAMPLE

The inventive floor covering material was tested for chemical resistance and compared against another (non-inventive) product which was also tested. The formulation of the inventive flooring material was as follows: alumina, 55.3 wt%; gilsonite, 13.1 wt%; high oil asphalt, 7.8 wt%; coating asphalt, 7.1 wt%; isotactic polypropylene, 6.4 wt%; amorphous polypropylene, 6.4 wt%; and cellulose fiber, 3.9 wt%. The formulation of the non-inventive, comparative material was as follows: fiber glass shingle scrap, 64.7 wt%; high oil asphalt, 6.8 wt%; limestone, 9.7 wt%; clay-cellulose fiber, 1.8 wt%; and gilsonite, 11.0 wt%.

Test samples were fully submerged in a range of concentrated solutions (listed below) for seven days. Test results given below are based on the amount of weight change over the seven day test period.

| CHEMICAL | CHEMICAL RESISTANCE | |
|---|---|---|
| | NON-INVENTIVE MATERIAL | INVENTIVE MATERIAL |
| ACIDS | | |
| Hydrochloric (0-35%) | B | A |
| Nitric (0-70%) | C | A-B |
| Sulfuric (0-100%) | C | B |
| Acetic (0-100%) | A-B | A |
| Phosphoric (0-85%) | B-C | A |
| BASES | | |
| Sodium Hydroxide (0-35%) | A | A |
| Ammonium Hydroxide (0-33%) | A | A |
| SALTS (saturated solutions) | | |
| Aluminum Sulfate | A | A |
| Ammonium Chloride | A | A |
| Calcium Chloride | A | A |
| Ferric Chloride | A | A |
| Sodium Chloride | A | A |
| Zinc Sulfate | A | A |
| CLEANING SOLUTIONS | | |
| Ammonia | A | A |
| Bleach | A | A |
| Trisodium Phosphate | A | A |

NOTE:
A - NO CHEMICAL ATTACK
B - MINOR WEIGHT CHANGE
C - MAJOR WEIGHT CHANGE

The foregoing data indicate that the inventive material clearly has a superior, excellent acid resistance compared to the non-inventive material. The inventive material offers a clearly higher resistance to both organic and inorganic acids as compared to the non-inventive material.

Reasonable modifications and variations are possible from the foregoing disclosure without departing from either the spirit or scope of the invention as defined in the appended claims.

We claim:

1. A composition suitable for use as a floor covering, said composition comprising about:
   (a) 50-65 wt% refractory oxide;
   (b) 9-15 wt% asphaltite;
   (c) 5-10 wt% high oil asphalt having an asphaltene content of less than about 15 wt% and a penetration value (at 77° F.) in the range of about 140 to 180 dmm;
   (d) 5-15 wt% asphalt having a softening point in the range of about 210°-230° F.;
   (e) 0-7 wt% reinforcing fiber;
   (f) 5-15 wt% crystalline polypropylene polymer; and
   (g) 0-10 wt% non-crystalline polypropylene polymer.

2. A composition according to claim 1 comprising about:
   (a) 52-58 wt% refractory oxide;
   (b) 11-15 wt% asphaltite;
   (c) 6-9 wt% high oil asphalt having an asphaltene content of less than about 15 wt% and a penetration value (at 77° F.) in the range of about 140 to 180 dmm;
   (d) 5-10 wt% asphalt having a softening point in the range of about 210°-230° F.;
   (e) 3-7 wt% reinforcing fiber;
   (f) 6-12 wt% crystalline polypropylene polymer; and
   (g) 0-10 wt% non-crystalline polypropylene polymer.

3. A composition according to claim 1 wherein said refractory oxide is alumina.

4. A composition according to claim 1 wherein said asphaltite is selected from the group consisting of glance pitch, grahamite, and gilsonite.

5. A composition according to claim 1 wherein said asphaltite is gilsonite.

6. A composition according to claim 1 wherein said reinforcing fibers are organic.

7. A composition according to claim 5 wherein said reinforcing fibers are cellulose.

8. A composition according to claim 7 wherein said reinforcing fibers are clay stabilizing cellulose fibers.

* * * * *